(12) United States Patent
Wen

(10) Patent No.: US 11,801,452 B2
(45) Date of Patent: *Oct. 31, 2023

(54) ROTARY EVAPORATOR CAPABLE OF ACCURATELY QUANTIFYING DISTILLATE

(71) Applicant: Beijing Normal University, Beijing (CN)

(72) Inventor: Shuyao Wen, Beijing (CN)

(73) Assignee: Beijing Normal University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,076

(22) Filed: Oct. 22, 2021

(65) Prior Publication Data

US 2022/0040593 A1 Feb. 10, 2022

Related U.S. Application Data

(63) Continuation of application No. 16/935,696, filed on Jul. 22, 2020, now Pat. No. 11,185,791, which is a (Continued)

(30) Foreign Application Priority Data

Jan. 23, 2018 (CN) .......................... 201810061892.4
Jan. 23, 2018 (CN) .......................... 201810061916.6

(51) Int. Cl.
*B01D 3/08* (2006.01)
*B01D 1/00* (2006.01)
(Continued)

(52) U.S. Cl.
CPC .......... *B01D 3/085* (2013.01); *B01D 1/0023* (2013.01); *B01D 3/42* (2013.01); *B01D 5/006* (2013.01);
(Continued)

(58) Field of Classification Search
CPC ........ B01D 1/0023; B01D 3/085; B01D 3/42; B01L 3/0289
See application file for complete search history.

(56) References Cited

U.S. PATENT DOCUMENTS 3,364,731 A  1/1968 Hook
4,250,739 A  2/1981 Audeh et al.
(Continued)

FOREIGN PATENT DOCUMENTS

CN  2892229 Y  4/2007
CN  204275520 U  4/2015
CN  105149025 A  12/2015

*Primary Examiner* — Jonathan Miller
(74) *Attorney, Agent, or Firm* — Duane Morris LLP

(57) ABSTRACT

The present invention provides a rotary evaporator capable of accurately quantifying concentrated liquid and/or distillate. A distillation flask is improved into a structure having a liquid discharge opening formed at the bottom, and/or a spherical collecting flask is improved into a structure having a liquid release opening formed at the bottom. Concentrated liquid and/or distillate can be discharged without dismounting the distillation flask and/or the collecting flask. In addition, fine metering scale tubes and quantitative capacity increase units are disposed at the liquid discharge opening and/or the liquid release opening, there is a valve on the top and another valve on the bottom of each tube, so that the constant subtle changes of the amount of concentrated liquid and/or distillate can be observed, and an accurate amount of concentrated liquid and/or distillate can be discharged.

13 Claims, 6 Drawing Sheets

Related U.S. Application Data continuation of application No. PCT/CN2018/121938, filed on Dec. 19, 2018.

(51) Int. Cl.
*B01D 3/42* (2006.01)
*B01D 5/00* (2006.01)
*B01L 3/02* (2006.01)

(52) U.S. Cl.
CPC ..... *B01L 3/0289* (2013.01); *B01L 2200/0605* (2013.01)

(56) References Cited

U.S. PATENT DOCUMENTS

| | | |
|---|---|---|
| 4,528,635 A | 7/1985 | Juodikis et al. |
| 4,759,825 A | 7/1988 | Medvey et al. |
| 5,053,111 A | 10/1991 | Ellerbe, Jr. |
| 5,639,354 A | 6/1997 | Zellweger |
| 10,837,929 B2 | 11/2020 | Zimmermann et al. |
| 11,185,791 B2 * | 11/2021 | Wen .................. B01D 3/42 |
| 2003/0000651 A1 | 1/2003 | Genser |
| 2013/0153397 A1 | 6/2013 | Carl et al. |
| 2018/0036648 A1 | 2/2018 | Urvantsau et al. |
| 2018/0345271 A1 | 12/2018 | Kozlenko et al. |

* cited by examiner

ROTARY EVAPORATOR CAPABLE OF ACCURATELY QUANTIFYING DISTILLATE

PRIORITY CLAIM AND CROSS-REFERENCE

This application is a continuation of U.S. patent application Ser. No. 16/935,696, filed Jul. 22, 2020, which claims the benefit of and priority to International Patent Application No. PCT/CN2018/121938, filed Dec. 19, 2018 and published as WO 2019/144730 A1, which claims the benefits of and priority to Chinese Patent Application No. 201810061892.4, filed Jan. 23, 2018, and Chinese Patent Application No. 201810061916.6, filed Jan. 23, 2018, all of which are incorporated by reference herein in their entirety.

BACKGROUND

Field of Invention

The present invention relates to the technical field of chemical experiment equipment, particularly to a rotary evaporator, and more particularly to a rotary evaporator capable of accurately quantifying concentrated liquid and/or distillate.

Background

A rotary evaporator is extraction experiment equipment for performing reduced pressure distillation concentration on materials, is widely applied to experiments of scale concentration, drying, extraction recovery and the like of samples, and is especially used to fast distill a large number of solvents. An existing rotary evaporator generally consists of assemblies such as a vacuum pumping device, a heating device, a condensing device, a rotating device, etc. The rotary evaporator has a main principle that through the control by electronic equipment, a flask rotates at the most suitable constant rotating speed to enable a solution to form a film, thus increasing the evaporation area. An evaporation flask is in a negative pressure state through a vacuum pump. The evaporation flask is placed in a water bath pot or an oil bath pot to be heated at a constant temperature while rotating. The heating temperature may be close to the boiling point of the solvent, so that the solution in the flask is heated and diffused at the negative pressure to be evaporated, and fast evaporation of the solvent is realized.

As for an existing common rotary evaporator (by taking RE-3000 manufactured by Shanghai Yarong Biochemical Instrument Factory as an example), the temperature of a heating pot, the rotating speed of a distillation flask and the height of the distillation flask in the water bath pot can be set in a use process, and an experimenter can accurately weigh the amount of feedstock before distillation. However, the amount of distillate in a collecting flask or the amount of concentrated liquid in the distillation flask corresponding to the distillation stopping time in a distillation process cannot be accurately determined, and usually depends on observation and feeling of an experimenter completely. In many cases, even if the distillation time is defined, since the time from the beginning of vacuum pumping of the distillation to the moment when the normal negative pressure level is reached through vacuum pumping each time is not exactly the same, and the sealing condition of the rotary evaporator should be taken into account, the distillation stopping time point cannot be accurately determined by a simple method of defining the distillation time. Moreover, distillation flasks are generally in spherical shapes, for the liquid level height, even if a highly experienced experimenter draws a line on the flask to determine the distillation stopping time point, the distillation distillate of different samples still have an error of at least 1.5 mL, and this will seriously affect the judgment of a researcher doing reduced pressure distillation on the distillation end point. Especially, when the feedstock is different samples randomly collected in the natural world, various ingredient indexes of the feedstock, the distillate or the concentrated liquid need to be determined after the distillation experiment is completed, but the distillation yield of different samples, i.e., the ratio of the amount of the distillate to the amount of the feedstock or the ratio of the amount of the concentrated liquid to the amount of the feedstock cannot be kept accurate or consistent, so that distillation results of different samples cannot be compared. The experimenter often wants both high yield and good quality; however, the condition of high yield but low quality index of concentrated liquid or distillate, or low yield but high quality index of concentrated liquid or distillate often occurs in the practical work. These conditions cause higher judgment difficulty on the condition of more than one quality evaluation index. For the operation of the rotary evaporation, how to accurately realize quantitative control and liquid discharge of the distillate and quantitative control and liquid discharge of the concentrated liquid has important significance for comparing the quality of the concentrated liquid or the distillate of different distillation samples and the performance of the concentrated liquid or the distillate of the same sample at different concentration degrees on the basis of ensuring the constant yield.

SUMMARY

The present invention provides a rotary evaporator capable of accurately quantifying concentrated liquid, and solves the problem about accurate quantitative control of the concentrated liquid.

The present invention further provides a rotary evaporator capable of accurately quantifying distillate, and solves the problem about accurate quantitative control of the distillate.

The present invention further provides a rotary evaporator capable of accurately quantifying distillate and concentrated liquid, and solves the problem about accurate quantitative control of the distillate and the concentrated liquid.

In order to achieve the above objectives, the present invention provides a rotary evaporator capable of accurately quantifying concentrated liquid. The rotary evaporator capable of accurately quantifying concentrated liquid includes a support frame. A dismountable distillation flask and a dismountable condenser are fixed on the support frame. A rotary motor is further included. The distillation flask is heated through a heating assembly. The bottom of the condenser is connected with a collecting flask. The top of the condenser is connected with a vacuum pumping device. The rotary motor drives the distillation flask to rotate.

A distillation flask liquid discharge opening is formed at the bottom of a work position or state of the distillation flask. The distillation flask liquid discharge opening is connected with a concentrated liquid quantification assembly to realize accurate quantitative control of the concentrated liquid.

The concentrated liquid quantification assembly includes a quantitative tube with quantitative scale lines, a first liquid discharge valve and a second liquid discharge valve. Liquid discharge of the concentrated liquid and sealing of the distillation flask are controlled through the second liquid discharge valve disposed at the bottom of the quantitative tube.

The quantitative tube is of a fine tubular structure. A capacity of the quantitative tube is a value in a range of 1 to 20 mL.

The first liquid discharge valve is disposed at the distillation flask liquid discharge opening, and performs discharge control of the concentrated liquid and sealing of the distillation flask. The distillation flask liquid discharge opening is formed in a lowest liquid level position of the distillation flask.

A concentrated liquid quantification assembly and the distillation flask liquid discharge opening are of an integrally formed structure, or are connected in a sealed way through glass ground openings, and are fixed by a clamp.

A tail end of the concentrated liquid quantification assembly far away from the distillation flask liquid discharge opening is further connected with a quantitative capacity increase unit in a sealed way. The quantitative capacity increase unit may also include a spherical expansion portion at the lower part of the quantitative tube above the second liquid discharge valve. In another word, such a spherical expansion portion functions as a quantitative capacity increase unit. The quantitative capacity increase unit is configured to realize one-step capacity increase liquid discharge of the concentrated liquid.

The quantitative capacity increase units include a plurality of quantitative capacity increase units with different capacities, and are selected and replaced according to capacity requirements of the concentrated liquid.

The capacities of the quantitative capacity increase units include 10 mL, 20 mL, 30 mL, 50 mL, 100 mL and 200 mL, and are not limited thereto.

The heating assembly is an electric heating belt disposed at an outer wall of the distillation flask. Preferably, the electric heating belt is wound around the outer wall of the distillation flask.

An outer layer of the electric heating belt is provided with a glass fiber belt, and heat isolation and fixation of the electric heating belt are realized.

A temperature controller sensor probe is further disposed between the electric heating belt and the distillation flask.

In order to achieve the above objectives, the present invention provides a rotary evaporator capable of accurately quantifying distillate. The rotary evaporator capable of accurately quantifying distillate includes a support frame. A dismountable distillation flask and a dismountable condenser are fixed on the support frame. A rotary motor is further included. The distillation flask is heated through a heating assembly. The bottom of the condenser is connected with a collecting flask. The top of the condenser is connected with a vacuum pumping device. The rotary motor drives the distillation flask to rotate.

A liquid release opening is formed at the bottom of the collecting flask. The liquid release opening is connected with a distillate quantification assembly to realize accurate quantitative control of the distillate.

The distillate quantification assembly includes a metering tube with metering scale lines, a first liquid release valve and a second liquid release valve. Liquid discharge of the distillate and sealing are controlled through the second liquid release valve disposed at the bottom of the metering tube.

The metering tube is of a fine tubular structure. A capacity of the metering tube is a value in a range of 1 to 20 mL.

The first liquid release valve is disposed at the liquid release opening, and performs distillate discharge control and sealing.

The liquid release opening is formed in a lowest liquid level position of the collecting flask.

The distillate quantification assembly and the liquid release opening are of an integrally formed structure, or are connected in a sealed way through glass ground openings, and are fixed by a clamp.

A tail end of the distillate quantification assembly far away from the liquid release opening is further connected with a metering capacity increase unit in a sealed way. The metering capacity increase unit may also include a spherical expansion portion at the lower part of the metering tube above the second liquid release valve. In another word, such a spherical expansion portion functions as a metering capacity increase unit. The metering capacity increase unit is configured to realize one-step capacity increase liquid discharge of the distillate.

The metering capacity increase unit and the distillate quantification assembly are connected in a sealed way through glass ground openings, and are fixed by a clamp.

The metering capacity increase units include a plurality of metering capacity increase units with different capacities, and are selected and replaced according to capacity requirements of the distillate.

The capacities of the metering capacity increase units include 10 mL, 20 mL, 30 mL, 50 mL, 100 mL and 200 mL, and are not limited thereto.

In order to achieve the above objectives, the present invention provides a rotary evaporator capable of accurately quantifying concentrated liquid and distillate. The rotary evaporator capable of accurately quantifying concentrated liquid and distillate includes a support frame. A dismountable distillation flask and a dismountable condenser are fixed on the support frame. A rotary motor is further included. The distillation flask is heated through a heating assembly. The bottom of the condenser is connected with a collecting flask. The top of the condenser is connected with a vacuum pumping device. The rotary motor drives the distillation flask to rotate.

A distillation flask liquid discharge opening is formed at the bottom of a work position or state of the distillation flask. The distillation flask liquid discharge opening is connected with a concentrated liquid quantification assembly to realize accurate quantitative control of the concentrated liquid.

A liquid release opening is formed at a side wall of the bottom of the collecting flask. The liquid release opening is connected with the distillate quantification assembly to realize accurate quantitative control of the distillate.

The concentrated liquid quantification assembly includes a quantitative tube with quantitative scale lines, a first liquid discharge valve and a second liquid discharge valve. Liquid discharge of the concentrated liquid and sealing of the distillation flask are controlled through the second liquid discharge valve disposed at the bottom of the quantitative tube.

The quantitative tube is of a fine tubular structure. A capacity of the quantitative tube is a value in a range of 1 to 20 mL.

The distillate quantification assembly includes a metering tube with metering scale lines, a first liquid release valve and a second liquid release valve. Liquid discharge of the distillate and sealing are controlled through a second liquid release valve disposed at the bottom of the metering tube.

The metering tube is of a fine tubular structure. A capacity of the metering tube is a value in a range of 1 to 20 mL.

The first liquid discharge valve is disposed at the distillation flask liquid discharge opening, and performs discharge control of the concentrated liquid and sealing of the distillation flask. The distillation flask liquid discharge opening is formed in a lowest liquid level position of the distillation flask.

The first liquid release valve is disposed at the liquid release opening, and performs distillate discharge control and sealing. The liquid release opening is formed in a lowest liquid level position of the collecting flask.

The concentrated liquid quantification assembly and the distillation flask liquid discharge opening are of an integrally formed structure, or are connected in a sealed way through glass ground openings, and are fixed by a clamp.

The distillate quantification assembly and the collecting flask liquid release opening are of an integrally formed structure, or are connected in a sealed way through glass ground openings, and are fixed by a clamp.

A tail end of the concentrated liquid quantification assembly far away from the distillation flask liquid discharge opening is further connected with a quantitative capacity increase unit in a sealed way. The quantitative capacity increase unit may also include a spherical expansion portion at the lower part of the quantitative tube above the second liquid discharge valve. In another word, such a spherical expansion portion functions as a quantitative capacity increase unit. The quantitative capacity increase unit is configured to realize one-step capacity increase liquid discharge of the concentrated liquid.

A tail end of the distillate quantification assembly far away from the collecting flask liquid release opening is further connected with a metering capacity increase unit in a sealed way. The metering capacity increase unit may also include a spherical expansion portion at the lower part of the metering tube above the second liquid release valve. In another word, such a spherical expansion portion functions as a metering capacity increase unit. The metering capacity increase unit is configured to realize one-step capacity increase liquid discharge of the distillate.

The quantitative capacity increase units include a plurality of quantitative capacity increase units with different capacities, and are selected and replaced according to capacity requirements of the concentrated liquid. The quantitative capacity increase unit and the concentrated liquid quantification assembly are connected in a sealed way through glass ground openings, and are fixed by a clamp.

The metering capacity increase units include a plurality of metering capacity increase units with different capacities, and are selected and replaced according to capacity requirements of the distillate. The metering capacity increase unit and the distillate quantification assembly are connected in a sealed way through glass ground openings, and are fixed by a clamp.

The capacities of the metering capacity increase units include 10 mL, 20 mL, 30 mL, 50 mL, 100 mL and 200 mL, and are not limited thereto.

The capacities of the quantitative capacity increase units include 10 mL, 20 mL, 30 mL, 50 mL, 100 mL and 200 mL, and are not limited thereto.

The heating assembly is an electric heating belt disposed at an outer wall of the distillation flask. Preferably, the electric heating belt is wound at the outer wall of the distillation flask.

An outer layer of the electric heating belt is provided with a glass fiber belt, and heat isolation and fixation of the electric heating belt are realized.

A temperature controller sensor probe is further disposed between the electric heating belt and the distillation flask.

According to the rotary evaporator capable of accurately quantifying concentrated liquid of the present invention, the distillation flask is improved into a structure having the distillation flask liquid discharge opening formed at the bottom, and the concentrated liquid can be discharged without dismounting the distillation flask. In addition, a quantitative fine tube is disposed at the distillation flask liquid discharge opening, so that the constant subtle changes of the amount of the concentrated liquid can be intuitively observed. As soon as the concentrated liquid reaches the designed accurate amount, the first liquid discharge valve is closed immediately and the distillation is stopped simultaneously. The accurately quantified concentrated liquid can be accurately discharged after the second liquid discharge valve is opened to determine a distillation yield. Under the condition of consistent distillation yield, indexes for indicating the quality of the concentrated liquid, such as concentrated liquid ingredients, are determined to study and compare performance indexes of concentrated liquid of different distillation samples with the same yield and performance indexes of concentrated liquid of the same sample at different concentration degrees. At the same time, the rotary evaporator of the present invention replaces an existing water bath pot or oil bath pot with the electric heating belt as a heating assembly to heat the distillation flask. On one hand, the size of the rotary evaporator is greatly reduced, and water consumption and oil consumption for heating in the evaporation process are reduced. Additionally, the distillation flask can realize direct liquid discharge of the concentrated liquid, so that the whole rotary evaporator does not need an ascending and descending system or an angle regulating system. Assemblies of the whole rotary evaporator are reduced. The cost is reduced.

According to the rotary evaporator capable of accurately quantifying distillate of the present invention, an existing spherical collecting flask is improved into a structure having a liquid release opening at the bottom by the rotary evaporator. The distillate can be discharged without dismounting the collecting flask. In addition, a metering tube is disposed at the liquid release opening, so that the constant subtle changes of the amount of the distillate can be intuitively observed. As soon as the distillate reaches the designed accurate amount, the first liquid release valve is closed immediately and the distillation is stopped simultaneously. The accurately quantified distillate can be accurately discharged after the second liquid release valve is opened to determine a distillation yield. Under the condition of consistent distillation yield, indexes reflecting the quality of the distillate, such as each ingredient of the distillate, are determined to study and compare the distillate performance of different distillation samples with the same yield and the distillate performance differences of the same distillation sample at different distillation stages.

According to the rotary evaporator capable of accurately quantifying concentrated liquid and distillate of the present invention, the distillation flask and the collecting flask are further improved into structures respectively having the liquid discharge opening and the liquid release opening at the bottoms. The concentrated liquid can be discharged without dismounting the distillation flask. The distillate can be discharged without dismounting the collecting flask. At the same time, the quantitative tube is disposed at the liquid discharge opening, and the metering tube is disposed at the liquid release opening, so that the constant subtle changes of the amount of the concentrated liquid and the distillate can be intuitively observed. As soon as the concentrated liquid and (or) the distillate reach(es) the designed accurate amount, the first liquid discharge valve and (or) the first liquid release valve are (is) closed immediately and the distillation is stopped simultaneously. The accurately quantified concentrated liquid and (or) distillate can be accurately discharged after the second liquid discharge valve and (or) the second liquid release valve are (is) opened to determine the distillation yield. Under the condition of consistent distillation yield, indexes such as ingredients of the concentrated liquid and (or) the distillate are determined to study and compare the performance of the concentrated liquid and the distillate of different distillation samples with the same yield and to study performance differences of the concentrated liquid and distillate of the same distillation sample at different concentration degrees. At the same time, the rotary evaporator of the present invention replaces an existing water (oil) bath pot with the electric heating belt as a heating assembly to heat the distillation flask. On one hand, the size of the rotary evaporator is greatly reduced, and water consumption and oil consumption for heating in the evaporation process are reduced. Additionally, the distillation flask can realize direct discharge of the concentrated liquid, so that the whole rotary evaporator does not need an ascending and descending system or an angle regulating system. Assemblies of the whole rotary evaporator are reduced. The cost is reduced.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

Figure 1:
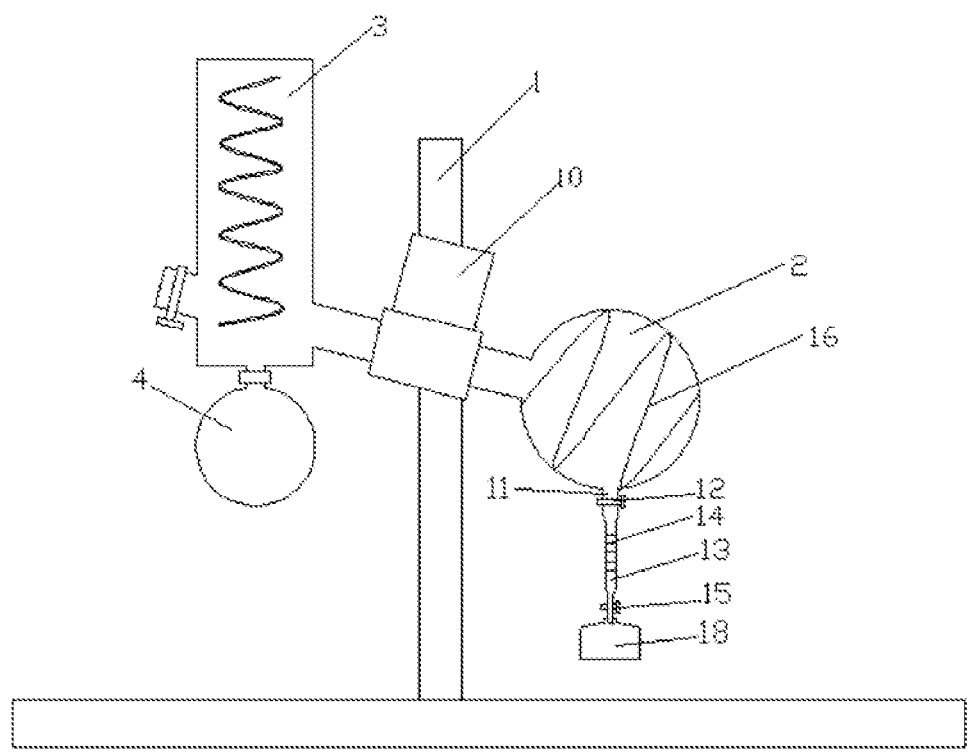
FIG. 1 is a schematic structure diagram of a rotary evaporator according to Embodiment 1 of the present invention.

In the figures, 1 denotes a support frame; 2 denotes a distillation flask; 3 denotes a condenser; 4 denotes a collecting flask; 5 denotes a collecting flask liquid release opening; 6 denotes a first liquid release valve; 7 denotes a metering tube; 8 denotes a metering scale line; 9 denotes a second liquid release valve; 10 denotes a rotary motor; 11 denotes a distillation flask liquid discharge opening; 12 denotes a first liquid discharge valve; 13 denotes a quantitative tube; 14 denotes a quantitative scale line; 15 denotes a second liquid discharge valve; 16 denotes an electric heating belt; 17 denotes a metering capacity increase unit; 18 denotes a quantitative capacity increase unit; 19 denotes a clamp; 20 denotes a solution containing tray; and 21, 22 denote an expansion portion at the lower part of a metering or quantitative tube.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like such as "connected" refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure, the concentration liquid quantification assembly and the distillate quantification assembly including their components can be the same or exchangeable. Different names are used for the convenience of descriptions only. For example, the metering tube 7 and the quantification tube 13 can be the same or exchangeable. The metering capacity increase unit 17 and the quantitative capacity increase unit 18 can be the same or exchangeable. The related valves such as 6, 9, 12, and 15 can be the same or exchangeable. In some embodiments, the "quantitative control" of the distillate or the concentrated liquid refers to controlling the volume or capacity of the respective liquid.

To make the objectives, features, and advantages of the present invention more obvious and comprehensible, the present invention is further described in detail below with reference to the accompanying drawings and specific implementations.

Embodiment 1

As shown in FIG. 1, a rotary evaporator capable of accurately quantifying concentrated liquid according to the present embodiment includes a support frame 1. A dismountable distillation flask 2 and a dismountable condenser 3 are fixed on the support frame 1. Liquid to be distilled is contained in the distillation flask 2. Evaporation concentration is realized through heating by a heating assembly. The bottom of the condenser 3 is connected with a collecting flask 4 configured to collect distillate. A rotary motor 10 for controlling the distillation flask 2 to rotate (the rotary evaporator of the present invention may further be provided with a control panel for controlling a parameter rotating speed of the rotary motor and a heating temperature, and the control panel is not shown in the figure), a control assembly for controlling the rotating speed and the heating temperature, a vacuum pumping assembly and the like are further disposed on the support frame.

According to the rotary evaporator as shown in FIG. 1, a distillation flask liquid discharge opening 11 is formed at the bottom of the distillation flask 2 (subject to a work state position of the distillation flask 2). The distillation flask liquid discharge opening 11 is formed in a liquid level bottom position of the distillation flask 2, and is preferably formed in a lowest liquid level position of the distillation flask 2. Additionally, a first liquid discharge valve 12 is further disposed at the distillation flask liquid discharge opening 11, and is configured to perform liquid discharge control of the concentrated liquid and sealing of the distillation flask. The first liquid discharge valve 12 may use a glass material or a polytetrafluoroethylene material.

According to the rotary evaporator of the present embodiment, the distillation flask 2 further includes a concentrated liquid quantification assembly connected with the distillation flask liquid discharge opening 11. The concentrated liquid quantification assembly can realize accurate quantitative control of the concentrated liquid. The concentrated liquid quantification assembly and the distillation flask liquid discharge opening 11 may be of an integrally formed structure or a structure connected in a sealed way through glass ground openings, and are fixed by a steel clamp with a screw to maintain sealing performance of a system.

According to the rotary evaporator as shown in FIG. 1, the concentrated liquid quantification assembly of the present embodiment includes preferably a quantitative tube 13, the first liquid discharge valve 12 and a second liquid discharge valve 15. Quantitative scales lines 14 are provided on an outer wall of the quantitative tube 13, and are configured to read an amount value of the concentrated liquid. The second liquid discharge valve 15 is disposed in a bottom position of the quantitative tube 13, so as to control liquid discharge of the concentrated liquid and sealing. As an optional structure, the quantitative tube 13 of the present embodiment may be a metering fine tube with a cavity of a fine tubular structure, and its metering capacity is suitable to be a value in a range of 1 to 10 mL. Its metering scale may be accurate to 0.01 mL, or even 0.005 mL. The second liquid discharge valve 15 may use a glass material or a polytetrafluoroethylene material.

Figure 4:
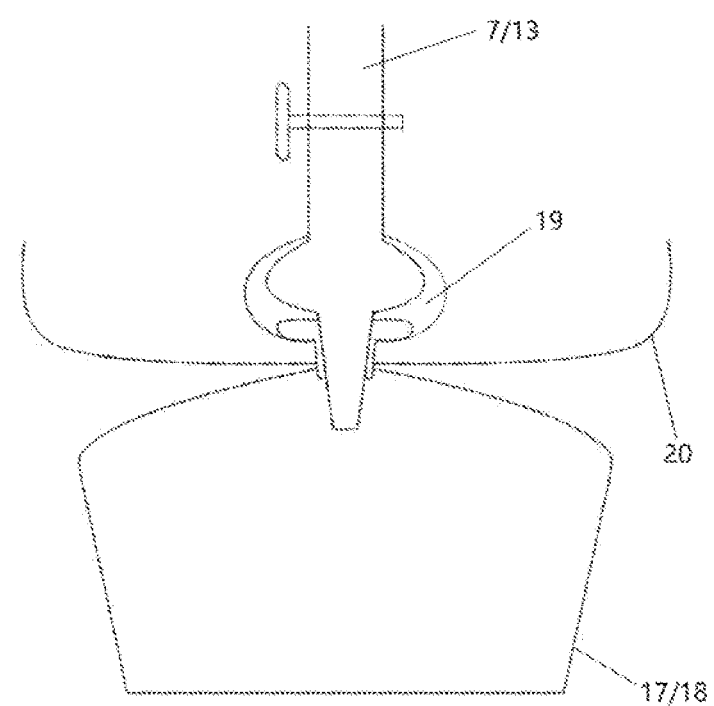
FIG. 4 is a schematic structure diagram of a metering capacity increase unit and a quantitative increase unit of the present invention.

As a transformable structure, according to the rotary evaporator as shown in FIG. 1, a quantitative capacity increase unit 18 is further connected to a tail end (the end provided with the second liquid discharge valve 15) of the quantitative tube 13 in a sealed way. The quantitative capacity increase unit 18 and the quantitative tube 13 are connected and sealed in a glass ground opening mode, and are fixed by a clamp. When the capacity of the quantitative tube 13 cannot meet the capacity requirement of the concentrated liquid, the quantifiable capacity of the concentrated liquid may be increased in a mode of adding the quantitative capacity increase unit 18, and one-step liquid discharge of the required amount of concentrated liquid is realized on the basis. An error caused by the need of reading for many times when the liquid is discharged for many times is reduced. The metering accuracy of the concentrated liquid is favorably improved. The capacity increase of the quantitative tube 13 is realized through accurate metering cooperation of the quantitative capacity increase unit 18 and the quantitative tube 13. The quantitative capacity increase units 18 of the present embodiment include a plurality of quantitative capacity increase units with different capacities, and are selected and replaced according to capacity requirements of the concentrated liquid. For example, the capacities of the quantitative capacity increase units 18 are designed into a plurality of values such as 10 mL, 20 mL, 30 mL, 50 mL, 100 mL and 200 mL to form one group. The proper quantitative capacity increase unit 18 is selected according to the required concentrated liquid capacity for one-step accurate liquid discharge of the concentrated liquid. A shape of the quantitative capacity increase unit 18 may select a suitable bent tube connecting tube structure or flat flask structure according to a distance from the distillation flask 2 to an operation platform, as long as the quantitative capacity increase unit 18 realizes matched sealing with a glass ground opening of the quantitative tube 13. According to a structure as shown in FIG. 4, as a preferable design, a certain capacity needs to be reserved outside a flask opening of the quantitative capacity increase unit 18, so as to contain a solution flowing down from the quantitative tube 13, and the objective is achieved by a solution containing tray 20 integrally formed with the quantitative capacity increase unit 18.

Figure 6:
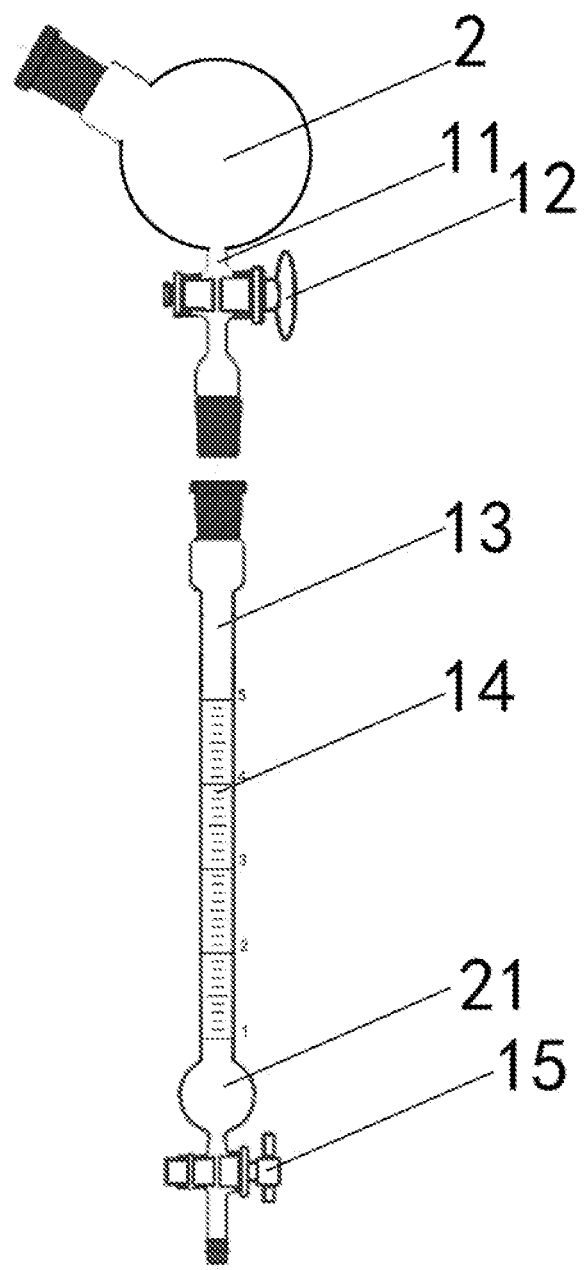
FIG. 6 is a schematic structure diagram illustrating an exemplary concentrated liquid quantification assembly including a quantitative tube having an expansion portion in accordance with some embodiments.

In some embodiments, as shown in FIG. 6, there is a spherical expansion portion 21 at the lower part of the quantitative tube 13 above the second liquid discharge valve 15. Such a spherical expansion portion 21 functions as a quantitative capacity increase unit.

In a structure of the rotary evaporator as shown in FIG. 1, the heating assembly is configured to perform heating evaporation on the liquid to be distilled in the distillation flask 2. In the present embodiment, the heating assembly is an electric heating belt 16 wound at an outer wall of the distillation flask 2. The electric heating belt 16 performs heating evaporation on the liquid to be distilled in the distillation flask 2 through heat conduction of the flask wall of the distillation flask. Preferably, the electric heating belt 16 is annularly wound at the outer wall of the distillation flask 2, so as to ensure heating uniformity. At the same time, a glass fiber belt is disposed outside the electric heating belt 16 and is used as a heat isolation material and a fixing layer to realize the heat isolation and fixation of the electric heating belt. A temperature controller sensor probe is further disposed between the electric heating belt 16 and the outer wall of the distillation flask 2, and detects a heating temperature.

According to the rotary evaporator of the present embodiment, at the beginning of the distillation, the first liquid discharge valve 12 is opened and the second liquid discharge valve 15 is closed, so that the inside of the distillation flask 2 still maintains a negative pressure state inside a distillation system. In a distillation process, the amount of the concentrated liquid is observed. As soon as the amount of the concentrated liquid reaches the designed accurate amount, the first liquid discharge valve 12 is closed immediately and the distillation is stopped simultaneously, and then the second liquid discharge valve 15 is opened. At this time, the determined amount of concentrated liquid is discharged, is used to determine the index indicating the quality of the concentrated liquid, such as each ingredient of the concentrated liquid and calculate the yield index, and is further used to study performance differences of the concentrated liquid of the same distillation sample at different concentration degrees.

Embodiment 2

Figure 2:
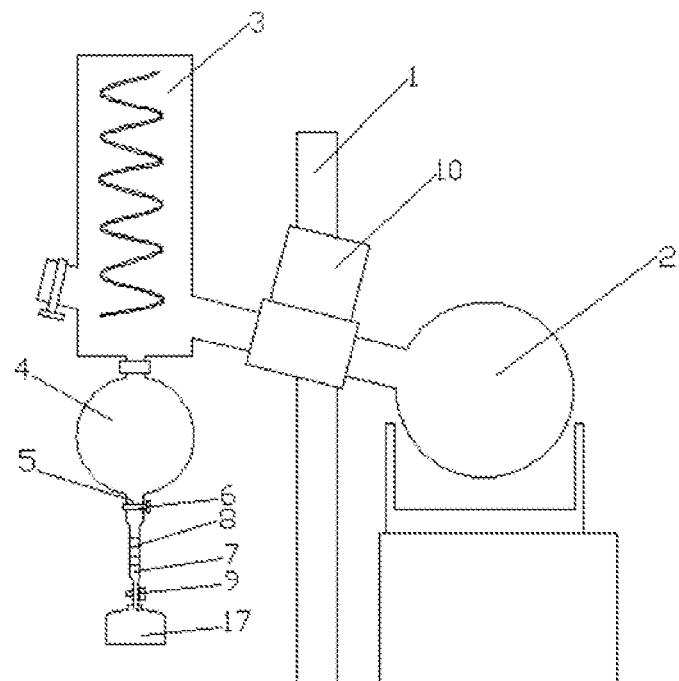
FIG. 2 is a schematic structure diagram of a rotary evaporator according to Embodiment 2 of the present invention.

Referring to a structure shown in FIG. 2, a rotary evaporator capable of accurately quantifying distillate according to the present embodiment includes a support frame 1. A dismountable distillation flask 2 and a dismountable condenser 3 are fixed on the support frame 1. Liquid to be distilled is contained in the distillation flask 2. Evaporation concentration is realized through heating by a heating assembly. The bottom of the condenser 3 is connected with a collecting flask 4 configured to collect the distillate. A rotary motor 10 for controlling the distillation flask 2 to rotate (the rotary evaporator of the present invention may further be provided with a control panel for controlling a rotating speed and a heating temperature, and the control panel is not shown in the figure), an ascending and descending assembly for controlling the distillation flask 2 to ascend and descend, a control assembly for controlling the heating temperature and the like are further disposed on the support frame. The heating assembly is an electric heating belt wound around the distillation flask or a water (oil) bath pot disposed under the distillation flask 2. The lower portion position of the distillation flask 2 is in contact with heating liquid of the water bath pot, and heating the liquid to be distilled in the distillation flask 2 is realized.

According to the rotary evaporator as shown in FIG. 2, a collecting flask liquid release opening 5 is formed at a bottom position of the collecting flask 4, is formed at a liquid level bottom position of the collecting flask 4, and is preferably formed at a lowest liquid level position of the collecting flask 4. Additionally, a first liquid release valve 6 is further disposed at the collecting flask liquid release opening 5, and is configured to perform liquid discharge control of the distillate and sealing. The first liquid release valve 6 of the collecting flask may use a glass material or a polytetrafluoroethylene material.

According to the rotary evaporator of the present embodiment, the collecting flask 4 further includes a distillate quantification assembly connected with the collecting flask liquid release opening 5. The distillate quantification assembly can realize accurate quantitative control of the distillate. The distillate quantification assembly and the collecting flask liquid release opening 5 may be of an integrally formed structure or a structure connected in a sealed way through glass ground openings, and are fixed by a steel clamp with a screw to maintain sealing performance of a system.

According to the rotary evaporator as shown in FIG. 2, the distillate quantification assembly of the present embodiment includes preferably a metering tube 7 connected with the collecting flask liquid release opening 5 in a sealed way, the first liquid release valve 6 and a second liquid release valve 9. Metering scale lines 8 are provided on an outer wall of the metering tube 7, and are configured to accurately meter the distillate. The second liquid release valve 9 is disposed at a bottom position of the metering tube 7, so as to control liquid discharge of the distillate and sealing. As an optional structure, the metering tube 7 of the present embodiment may be a metering fine tube with a cavity of a fine tubular structure, and its metering capacity is suitable to be a value in a range of 1 to 10 mL. Its metering scale may be accurate to 0.01 mL, or even 0.005 mL. The second liquid release valve 9 may use a glass material or a polytetrafluoroethylene material.

As a transformable structure, according to the rotary evaporator as shown in FIG. 2, a metering capacity increase unit 17 is further connected to a tail end (the end provided with the second liquid release valve 9) of the metering tube 7 in a sealed way. The metering capacity increase unit 17 and the metering tube 7 are connected and sealed in a glass ground opening mode, and are fixed by a clamp. When the capacity of the metering tube 7 cannot meet the capacity requirement of the distillate, the measurable capacity of the distillate may be increased in a mode of adding the metering capacity increase unit 17, and one-step liquid discharge of the required amount of distillate is realized on the basis. An error caused by the need of reading for many times when the liquid is discharged for many times is reduced. The metering accuracy of the distillate is favorably improved. The capacity increase of the metering tube 7 is realized through accurate metering cooperation of the metering capacity increase unit 17 and the metering tube 7. The metering capacity increase units 17 of the present invention include a plurality of metering capacity increase units with different capacities, and are selected and replaced according to the capacities of the distillate. For example, the capacities of the metering capacity increase units 17 are designed into a plurality of values such as 10 mL, 20 mL, 30 mL, 50 mL, 100 mL and 200 mL to form one group. The proper metering capacity increase unit 17 is selected according to the required distillate capacity for one-step accurate liquid discharge. A shape of the metering capacity increase unit 17 may select a suitable bent tube connecting tube structure or flat flask structure according to a distance from the collecting flask 4 to an operation platform, as long as the metering capacity increase unit 17 realizes matched sealing with a glass ground opening of the metering tube 7. According to a structure as shown in FIG. 4, as a preferable design, a certain capacity needs to be reserved outside a flask opening of the metering capacity increase unit 17 so as to contain a solution flowing down from the metering tube 7, and the objective is achieved by a solution containing tray 20 integrally formed with the metering capacity increase unit 17.

Figure 5:
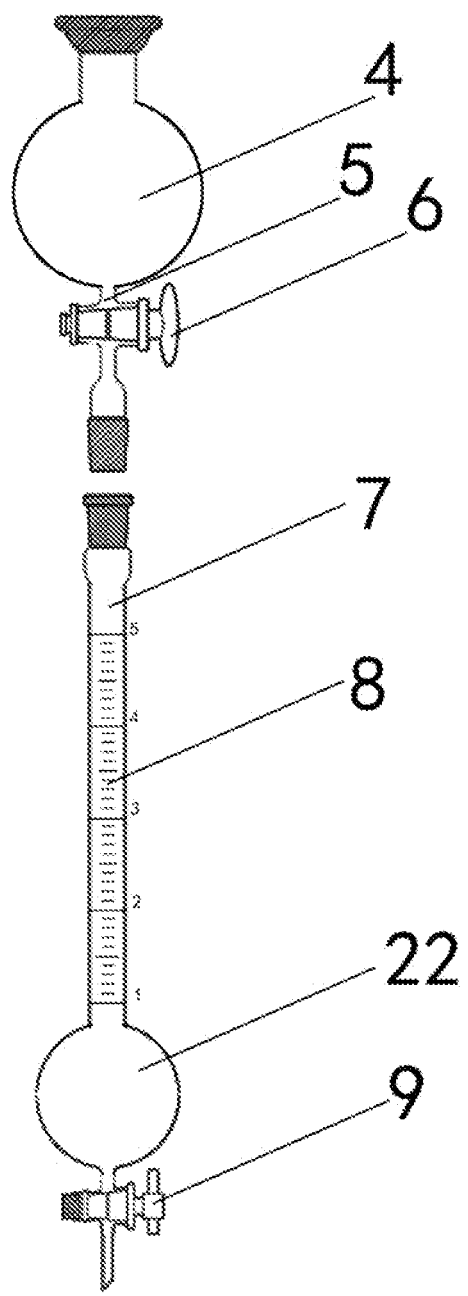
FIG. 5 is a schematic structure diagram illustrating an exemplary distillate quantification assembly including a metering tube having an expansion portion in accordance with some embodiments.
Figure 7:
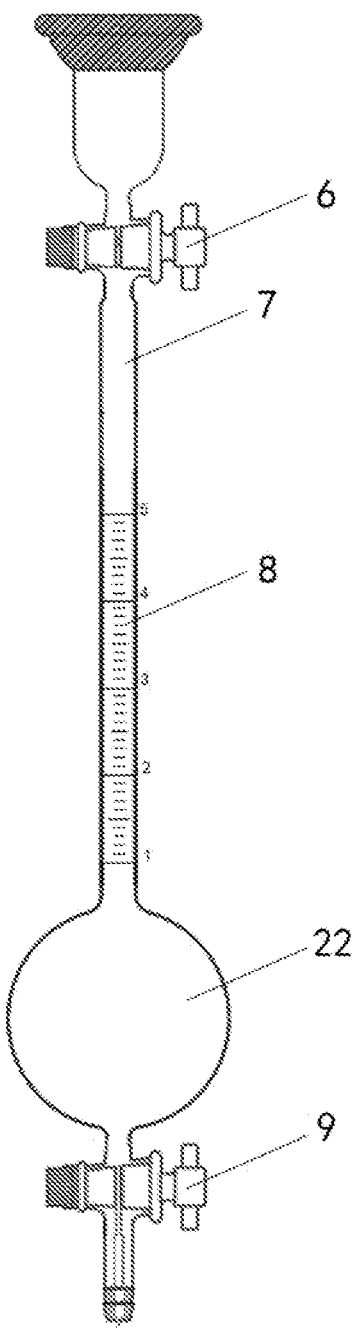
FIG. 7 is a schematic structure diagram illustrating another exemplary distillate quantification assembly including a metering tube having an expansion portion in accordance with some embodiments.

In some embodiment, as shown in FIGS. 5 and 7, the metering capacity increase unit may also include a spherical expansion portion 22 at the lower part of the metering tube 7 above the second liquid release valve 9. In another word, such a spherical expansion portion 22 functions as a metering capacity increase unit.

According to the rotary evaporator of the present embodiment, at the beginning of the distillation, the first liquid release valve 6 is opened and the second liquid release valve 9 is closed, so that the inside of the collecting flask 4 still maintains a negative pressure state inside a distillation system. In a distillation process, as soon as the observed amount of the distillate reaches the designed accurate amount, the first liquid release valve 6 is closed immediately, the distillation is stopped simultaneously, and then the second liquid release valve 9 is opened. At this time, the accurately quantified distillate is discharged, is used to determine the distillation yield and determine the index indicating the quality of the distillate, such as each ingredient of the distillate, and is further used to study performance differences of the distillate of the same distillation sample at different distillation stages.

Embodiment 3

Figure 3:
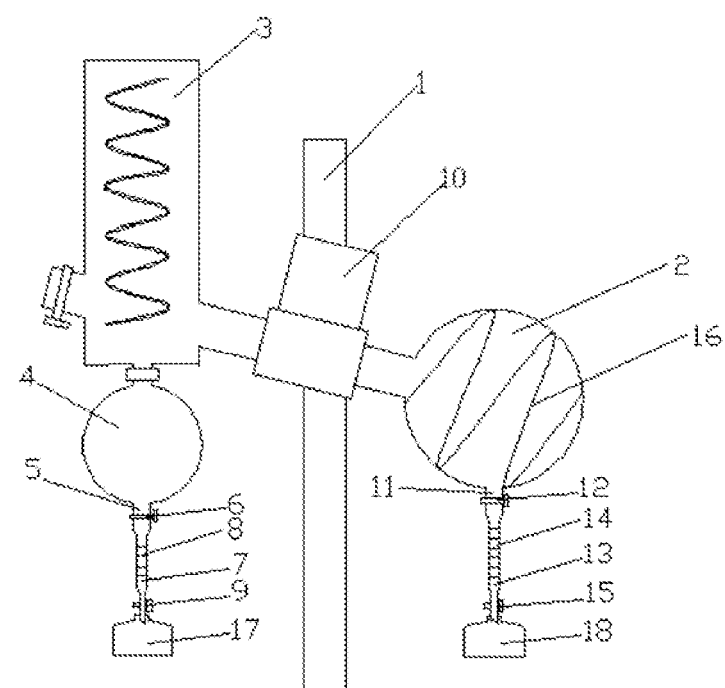
FIG. 3 is a schematic structure diagram of a rotary evaporator according to Embodiment 3 of the present invention.

As a transformable structure, according to a structure of the rotary evaporator as shown in FIG. 3, a rotary evaporator capable of accurately quantifying concentrated liquid and (or) distillate according to the present embodiment includes a support frame 1. A dismountable distillation flask 2 and a dismountable condenser 3 are fixed on the support frame 1. Liquid to be distilled is contained in the distillation flask 2. Evaporation concentration is realized through heating by a heating assembly. The bottom of the condenser 3 is connected with a collecting flask 4 configured to collect distillate. A rotary motor 10 for controlling the distillation flask 2 to rotate (the rotary evaporator of the present invention may further be provided with a control panel for controlling a rotating speed and a heating temperature, and the control panel is not shown in the figure), a control assembly for controlling the heating temperature and the like are further disposed on the support frame.

According to the rotary evaporator as shown in FIG. 3, a collecting flask liquid release opening 5 is formed at the bottom of the collecting flask 4, is formed at a liquid level bottom position of the collecting flask 4, and is preferably formed at a lowest liquid level position of the collecting flask 4. Additionally, a first liquid release valve 6 is further disposed at the collecting flask liquid release opening 5, and is configured to perform liquid discharge control of the distillate and sealing. The first liquid release valve 6 of the collecting flask may use a glass material or a polytetrafluoroethylene material.

According to the rotary evaporator of the present embodiment, the collecting flask 4 further includes a distillate quantification assembly connected with the collecting flask liquid release opening 5. The distillate quantification assembly can realize accurate quantitative control of the distillate. The distillate quantification assembly and the collecting flask liquid release opening 5 may be of an integrally formed structure or a structure connected in a sealed way through glass ground openings, and are fixed by a steel clamp with a screw to maintain sealing performance of a system.

According to the rotary evaporator as shown in FIG. 3, the distillate quantification assembly of the present embodiment includes a metering tube 7 connected with the collecting flask liquid release opening 5 in a sealed way, the first liquid release valve 6 and a second liquid release valve 9. Metering scale lines 8 are provided on an outer wall of the metering tube 7, and are configured to accurately meter the distillate. The second liquid release valve 9 is disposed at the bottom of the metering tube 7, so as to control liquid discharge of the distillate and sealing. As an optional structure, the metering tube 7 of the present embodiment may be a metering fine tube with a cavity of a fine tubular structure, and its metering capacity is suitable to be a value in a range of 1 to 10 mL. Its metering scale may be accurate to 0.01 mL, or even 0.005 mL. The second liquid release valve 9 may use a glass material or a polytetrafluoroethylene material.

As a transformable structure, according to the rotary evaporator as shown in FIG. 3, a metering capacity increase unit 17 is further connected to a tail end (the end provided with the second liquid release valve 9) of the metering tube 7 in a sealed way. The metering capacity increase unit 17 and the metering tube 7 are connected and sealed in a glass ground opening mode, and are fixed by a clamp. When the capacity of the metering tube 7 cannot meet the capacity requirement of the distillate, the measurable capacity of the distillate may be increased in a mode of adding the metering capacity increase unit 17, and one-step liquid discharge of the required amount of the distillate is realized on the basis. An error caused by the need of reading for many times when the liquid is discharged for many times is reduced. The metering accuracy of the distillate is favorably improved. The capacity increase of the metering tube 7 is realized through accurate metering cooperation of the metering capacity increase unit 17 and the metering tube 7. The metering capacity increase units 17 of the present invention include a plurality of metering capacity increase units with different capacities, and are selected and replaced according to capacity requirements of the distillate. For example, the capacities of the metering capacity increase units 17 are designed into a plurality of values such as 10 mL, 20 mL, 30 mL, 50 mL, 100 mL and 200 mL to form one group. The proper metering capacity increase unit 17 is selected according to the required distillate capacity for one-step accurate liquid discharge. A shape of the metering capacity increase unit 17 may select a suitable bent tube connecting tube structure or flat flask structure according to a distance from the collecting flask 4 to an operation platform, as long as the metering capacity increase unit 17 realizes matched sealing with a glass ground opening of the metering tube 7. According to a structure as shown in FIG. 4, as a preferable design, a certain capacity needs to be reserved outside a flask opening of the metering capacity increase unit 17 so as to contain a solution flowing down from the metering tube 7, and the objective is achieved by a solution containing tray 20 integrally formed with the metering capacity increase unit 17.

In some embodiment, as shown in FIG. 5, and FIG. 7 (without collecting flask 4), the metering capacity increase unit may also include a spherical expansion portion 22 at the lower part of the metering tube 7 above the second liquid release valve 9. In another word, such a spherical expansion portion 22 functions as a metering capacity increase unit. The distillate quantification unit assembly can be connected with the condenser 3.

According to the rotary evaporator as shown in FIG. 3, a distillation flask liquid discharge opening 11 is formed at a side wall of the bottom of the distillation flask 2 (subject to a work state position of the distillation flask 2). The distillation flask liquid discharge opening 11 is formed in a liquid level bottom position of the distillation flask 2, and is preferably formed in a lowest liquid level position of the distillation flask 2. Additionally, a first liquid discharge valve 12 is further disposed at the distillation flask liquid discharge opening 11, and is configured to perform liquid discharge control of the concentrated liquid and sealing. The first liquid discharge valve 12 may use a glass material or a polytetrafluoroethylene material.

According to the rotary evaporator of the present embodiment, the distillation flask 2 further includes a concentrated liquid quantification assembly connected with the distillation flask liquid discharge opening 11. The concentrated liquid quantification assembly can realize accurate quantitative control of the concentrated liquid. The concentrated liquid quantification assembly and the distillation flask liquid discharge opening 11 may be of an integrally formed structure or a structure connected in a sealed way through glass ground openings, and are fixed by a steel clamp with a screw to maintain sealing performance of a system.

According to the rotary evaporator as shown in FIG. 3, the concentrated liquid quantification assembly of the present embodiment includes preferably a quantitative tube 13 connected with the distillation flask liquid discharge opening 11 in a sealed way, the first liquid discharge valve 12 and the second liquid discharge valve 15. Quantitative scale lines 14 are provided on an outer wall of the quantitative tube 13, and are configured to accurately quantify the concentrated liquid. The second liquid discharge valve 15 is disposed in a bottom position of the quantitative tube 13, so as to control liquid discharge of the concentrated liquid and sealing. As an optional structure, the quantitative tube 13 of the present embodiment may be a metering fine tube with a cavity of a fine tubular structure, and its metering capacity is suitable a value in a range of 1 to 10 mL. Its metering scale may be accurate to 0.01 mL, or even 0.005 mL. The second liquid discharge valve 15 may use a glass material or a polytetrafluoroethylene material.

As a transformable structure, according to the rotary evaporator as shown in FIG. 3, a quantitative capacity increase unit 18 is further connected to a tail end (the end provided with the second liquid discharge valve 15) of the quantitative tube 13 in a sealed way. The quantitative capacity increase unit 18 and the quantitative tube 13 are connected and sealed in a glass ground opening mode, and are fixed by a clamp. When the capacity of the quantitative tube 13 cannot meet the capacity requirement of the concentrated liquid, the quantifiable capacity of the concentrated liquid may be increased in a mode of adding the quantitative capacity increase unit 18, and one-step liquid discharge of the required amount of concentrated liquid is realized on the basis. An error caused by the need of reading for many times when the liquid is discharged for many times is reduced. The metering accuracy of the concentrated liquid is favorably improved. The capacity increase of the quantitative tube 13 is realized through accurate metering cooperation of the quantitative capacity increase unit 18 and the quantitative tube 13. The quantitative capacity increase units 18 of the present embodiment include a plurality of quantitative capacity increase units with different capacities, and are selected and replaced according to capacity requirements of the concentrated liquid. For example, the capacities of the quantitative capacity increase units 18 are designed into a plurality of values such as 10 mL, 20 mL, 30 mL, 50 mL, 100 mL and 200 mL to form one group. The proper quantitative capacity increase unit 18 is selected according to the required concentrated liquid capacity for one-step accurate liquid discharge of the concentrated liquid. A shape of the quantitative capacity increase unit 18 may select a suitable bent tube connecting tube structure or flat flask structure according to a distance from the distillation flask 2 to an operation platform, as long as the quantitative capacity increase unit 18 realizes matched sealing with a glass ground opening of the quantitative tube 13. According to a structure as shown in FIG. 4, as a preferable design, a certain capacity needs to be reserved outside a flask opening of the quantitative capacity increase unit 18, so as to contain a solution flowing down from the quantitative tube 13, and the objective is achieved by a solution containing tray 20 integrally formed with the quantitative capacity increase unit 18.

In some embodiments, as shown in FIG. 6, there is a spherical expansion portion 21 at the lower part of the quantitative tube 13 above the second liquid discharge valve 15. Such a spherical expansion portion 21 functions as a quantitative capacity increase unit.

In a structure of the rotary evaporator as shown in FIG. 3, the heating assembly is configured to perform heating evaporation on the liquid to be distilled in the distillation flask 2. In the present embodiment, the heating assembly is an electric heating belt 16 disposed at an outer wall of the distillation flask 2. The electric heating belt 16 performs heating evaporation on the liquid to be concentrated in the distillation flask 2 through heat conduction of the flask wall of the distillation flask 2. Preferably, the electric heating belt 16 is wound around the outer wall of the distillation flask 2, so as to ensure heating uniformity. At the same time, a glass fiber belt is disposed at an outer layer of the electric heating belt 16 and is used as a heat isolation material and a fixing layer to realize the heat isolation and fixation of the electric heating belt. A temperature controller sensor probe is further disposed between the electric heating belt 16 and the outer wall of the distillation flask 2, and detects the heating temperature.

According to the rotary evaporator of the present embodiment, at the beginning of the distillation, the first liquid release valve 6 and the first liquid discharge valve 12 are opened, the second liquid release valve 9 and the second liquid discharge valve 15 are closed, so that the inside of the collecting flask 4 and the inside of the distillation flask 2 still maintain a negative pressure state inside a distillation system. In a distillation process, constant subtle changes of the amount of the distillate and the amount of the concentrated liquid are observed. As soon as the amount of the distillate or the concentrated liquid reaches the designed accurate amount, the first liquid release valve 6 and the first liquid discharge valve 12 are closed immediately, the distillation is stopped simultaneously, and then the second liquid release valve 9 and the second liquid discharge valve 15 are opened. At this time, the accurately quantified distillate or concentrated liquid is discharged, is used to determine the distillation yield and determine the index indicating the quality of the distillate or the concentrated liquid, such as each ingredient of the distillate or the concentrated liquid, is used to study and compare the performance of the concentrated liquid and distillate of different distillation samples, and is further used to study performance differences of the distillate of the same distillation sample at different distillation stages and the concentrated liquid at different concentration degrees.

The embodiments of the present invention are described in detail above. The principle and implementations of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of this specification shall not be construed as a limit to the present invention.

What is claimed is:

1. A rotary evaporator capable of quantifying distillate, comprising a support frame, a distillation flask and a condenser dismountably fixed on the support frame, and a distillate quantification assembly configured to quantify the distillate,
   wherein the distillation flask is configured to be heated through a heating assembly, and the condenser is coupled with the distillate quantification assembly;
   wherein the distillate quantification assembly includes a metering tube with metering scale lines, a first liquid release valve and a second liquid release valve, liquid discharge of the distillate and sealing of the distillate quantification assembly are controllable through the second liquid release valve disposed at a bottom of the metering tube,
   wherein the metering tube has a cavity of a tubular structure having a metering capacity in a range from 1 mL to 20 mL, and a metering scale with an accuracy to 0.01 mL, and
   wherein a tail end of the distillate quantification assembly is configured to be connected with at least one of a plurality of first containers in a sealed way, and the plurality of first containers are configured to increase metering capacity of the distillate.

2. The rotary evaporator according to claim 1, wherein the condenser is coupled with the distillate quantification assembly through a collecting flask disposed between the condenser and the distillate quantification assembly, a bottom of the condenser is connected with the collecting flask, wherein a collecting flask liquid release opening is at a bottom of the collecting flask, and is connected with the distillate quantification assembly.

3. The rotary evaporator according to claim 2, wherein the first liquid release valve is disposed at the collecting flask liquid release opening, and is configured to control discharge of the distillate and sealing of the collecting flask.

4. The rotary evaporator according to claim 1, wherein the condenser is directly coupled with and connected to the distillate quantification assembly, the first liquid release valve is disposed at an upper portion of the distillate quantification assembly, and is configured to control discharge of the distillate and sealing of the condenser.

5. The rotary evaporator according to claim 1, wherein the plurality of first containers include containers with different capacities, and are configured to be selected and replaced according to capacity requirements of the distillate.

6. The rotary evaporator according to claim 1, wherein the metering tube includes a spherical expansion portion at a lower part.

7. The rotary evaporator according to claim 6, wherein the spherical expansion portion is configured to increase metering capacity of the distillate.

8. The rotary evaporator according to claim 1, wherein the heating assembly is a water or oil bath or an electric heating belt at an outer wall of the distillation flask.

9. A rotary evaporator capable of quantifying distillate, comprising a support frame, a distillation flask and a condenser dismountably fixed on the support frame, a collecting flask, and a distillate quantification assembly for quantifying the distillate,
wherein the distillation flask is configured to be heated through a heating assembly, the condenser is coupled with the distillate quantification assembly, and a bottom of the condenser is connected with the collecting flask;
wherein a collecting flask liquid release opening is at a bottom of the collecting flask, the collecting flask liquid release opening is connected with the distillate quantification assembly;
wherein the distillate quantification assembly is configured to be connected with a bottom of the collecting flask and includes a metering tube with metering scale lines, a first liquid release valve and a second liquid release valve, liquid discharge of the distillate and sealing of distillate quantification assembly are controllable through the second liquid release valve disposed at a bottom of the metering tube;
wherein the first liquid release valve is disposed at the collecting flask liquid release opening, and is configured to control discharge of the distillate and sealing of the collecting flask;
wherein the metering tube has a cavity of a tubular structure having a metering capacity in a range from 1 mL to 20 mL, and a metering scale with an accuracy to 0.01 mL, and
wherein a tail end of the distillate quantification assembly is configured to be connected with at least one of a plurality of first containers in a sealed way, and the plurality of first containers are configured to increase metering capacity of the distillate.

10. The rotary evaporator according to claim 9, wherein the plurality of first containers include containers with different capacities, and are configured to be selected and replaced according to capacity requirements of the distillate.

11. The rotary evaporator according to claim 9, wherein the metering tube includes a spherical expansion portion at a lower part.

12. The rotary evaporator according to claim 11, wherein the spherical expansion portion is configured to increase metering capacity of the distillate.

13. The rotary evaporator according to claim 9, wherein the heating assembly is a water or oil bath or an electric heating belt at an outer wall of the distillation flask.

* * * * *